United States Patent
Clark et al.

(10) Patent No.: US 8,777,124 B2
(45) Date of Patent: Jul. 15, 2014

(54) IRRIGATION SPRINKLER WITH RATCHETING MANUAL NOZZLE ROTATION

(75) Inventors: Michael L. Clark, San Marcos, CA (US); Zackary B. Simmons, Escondido, CA (US)

(73) Assignee: Hunter Industries, Inc., San Marcos, CA (US)

(*) Notice: Subject to any disclaimer, the term of this patent is extended or adjusted under 35 U.S.C. 154(b) by 420 days.

(21) Appl. No.: 13/098,242

(22) Filed: Apr. 29, 2011

(65) Prior Publication Data

US 2012/0273593 A1 Nov. 1, 2012

(51) Int. Cl.
| | |
|---|---|
| *B05B 17/04* | (2006.01) |
| *B05B 1/00* | (2006.01) |
| *B05B 15/00* | (2006.01) |
| *B05B 1/26* | (2006.01) |
| *B05B 3/04* | (2006.01) |
| *B05B 3/16* | (2006.01) |
| *B05B 3/02* | (2006.01) |
| *A01G 25/00* | (2006.01) |
| *D21F 1/34* | (2006.01) |

(52) U.S. Cl.
CPC . *B05B 1/00* (2013.01); *B05B 15/00* (2013.01); *B05B 1/265* (2013.01); *B05B 3/0422* (2013.01); *B05B 3/0431* (2013.01); *B05B 3/0427* (2013.01); *B05B 3/16* (2013.01); *B05B 3/02* (2013.01); *A01G 25/00* (2013.01); *D21F 1/34* (2013.01)
USPC ............. 239/11; 239/203; 239/237; 239/240; 239/241; 239/242; 239/263

(58) Field of Classification Search
CPC .......... B05B 1/00; B05B 15/10; B05B 1/265; B05B 3/0422; B05B 3/0431; B05B 3/0427; B05B 3/16; B05B 3/02; A01G 25/00; D21F 1/34

USPC .............. 239/1, 11, 203–206, 237, 240, 241, 239/242, 263, 264
See application file for complete search history.

(56) References Cited

U.S. PATENT DOCUMENTS

| | | | |
|---|---|---|---|
| 4,204,642 A | 5/1980 | Hunter | 239/191 |
| 4,265,404 A | 5/1981 | Hunter | 239/186 |

(Continued)

OTHER PUBLICATIONS

Rain Bird 7005 Full/Part-circle Rotor Pop-Up Sprinkler—Rain Bird 2005-2006 Catalog, p. 88.

(Continued)

*Primary Examiner* — Steven J Ganey
(74) *Attorney, Agent, or Firm* — Knobbe Martens Olson & Bear LLP (57) ABSTRACT

A sprinkler includes a turbine, a nozzle, a gear train reduction and a reversing mechanism that rotatably couples the gear train reduction and the nozzle. The gear train reduction includes an input stage and a planetary gear drive output stage that includes a first portion of the reversing mechanism. A second portion of the reversing mechanism is located outside of the gear train reduction. The second portion of the reversing mechanism includes a pair of arc tabs. At least one of the arc tabs is adjustable to establish an arc of coverage of the sprinkler when the water flowing past the turbine causes the gear train reduction and the reversing mechanism to oscillate the nozzle back and forth between a pair of arc stops. The arc stops are defined by the locations of the arc tabs. The input stage of the gear train reduction includes a mechanism that allows manual rotation of the nozzle between the arc stops without having to back drive the gears in the input stage.

30 Claims, 12 Drawing Sheets

(56) References Cited

U.S. PATENT DOCUMENTS

| | | | |
|---|---|---|---|
| 4,301,967 A | 11/1981 | Hunter | 239/99 |
| 4,501,391 A | 2/1985 | Hunter | 239/97 |
| 4,568,023 A | 2/1986 | Hayes | 239/242 |
| RE32,386 E | 3/1987 | Hunter | 239/206 |
| 4,784,329 A | 11/1988 | Heren | 239/498 |
| 4,892,252 A | 1/1990 | Bruninga | 239/205 |
| 5,174,501 A | 12/1992 | Hadar | 239/242 |
| 5,330,103 A * | 7/1994 | Eckstein | 239/242 |
| 5,511,727 A | 4/1996 | Heren et al. | 239/242 |
| 5,645,218 A | 7/1997 | Heren et al. | 239/242 |
| 5,662,545 A | 9/1997 | Zimmerman et al. | 475/344 |
| 5,938,122 A | 8/1999 | Heren et al. | 239/242 |
| 6,042,021 A | 3/2000 | Clark | 239/205 |
| 6,491,235 B1 | 12/2002 | Scott et al. | 239/206 |
| 6,604,697 B1 | 8/2003 | Heren et al. | 239/723 |
| 7,017,831 B2 | 3/2006 | Santiago et al. | 239/206 |
| 7,028,920 B2 | 4/2006 | Hekman et al. | 239/240 |
| 7,677,469 B1 | 3/2010 | Clark | 239/242 |
| 8,469,288 B1 * | 6/2013 | Clark et al. | 239/242 |
| 2006/0049275 A1 | 3/2006 | Santiago et al. | 239/240 |

OTHER PUBLICATIONS

Toro 2001 Series Commercial including Data & Performance Charts, pp. 58-59.

Nelson Pro 7000, 7500 & Nelson Pro 5500, 6000,6500 Data Sheets, pp. 36-37.

* cited by examiner

IRRIGATION SPRINKLER WITH RATCHETING MANUAL NOZZLE ROTATION

FIELD OF THE INVENTION

The present invention relates apparatus for irrigating turf and landscaping, and more particularly, to rotor-type sprinklers having a turbine that rotates a nozzle through a gear train reduction.

BACKGROUND OF THE INVENTION

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a gear box. A reversing mechanism is also normally mounted in the riser along with an arc adjustment mechanism.

Oscillating rotor-type sprinklers with adjustable arc limits have been used extensively. Typically they have used a reversing mechanism with four pinion gears meshed together and mounted between upper and lower arc-shaped frames. One of the inner pinion gears is driven by the gear reduction mechanism. The frames rock back and forth with the aid of over-center springs and pinion gears on opposite ends of the frames alternately engage a bull gear. The main drawback of this design is that the pinion gears are held in engagement with the bull gears with a relatively weak spring force, which limits the amount of torque that can be applied to rotate the nozzle. One type of gear driven rotor-type sprinkler incorporates a planetary gear drive that includes at least a portion of the reversing mechanism. See U.S. Pat. No. 7,677,469, of Michael L. Clark granted Mar. 16, 2010, entitled "Sprinkler with Reversing Planetary Gear Drive." The advantage of including at least a portion of the overall reversing mechanism in the planetary gear drive is that the shifting can be done in a low torque region of the drive where damage and wear to gears is much less likely to occur.

SUMMARY OF THE INVENTION

In accordance with the present invention, a sprinkler includes a turbine, a nozzle and a gear train reduction having at least a reversing planetary gear drive portion. A reversing control mechanism is located outside of the gear train reduction and couples the gear train reduction and the nozzle. The reversing control mechanism includes a pair of arc tabs, at least one of the arc tabs being adjustable to establish an arc of coverage of the sprinkler when the water flowing past the turbine causes the gear train reduction and the reversing mechanism to oscillate the nozzle back and forth between a pair of arc stops defined by the locations of the arc tabs. A mechanism is located in the gear train reduction to allow manual rotation of the nozzle between the arc stops without having to back drive all of the gears in the gear train reduction.

DETAILED DESCRIPTION

When a user is installing an oscillating rotor-type irrigation sprinkler, it is desirable that the user have the ability to manually rotate the nozzle turret between its arc stops to allow the user to set the arc stops in the correct position. This establishes the desired arc of coverage. It would be desirable to provide this capability in a rotor-type sprinkler having a planetary gear drive that includes at least a portion of the reversing mechanism. In accordance with the present invention a ratcheting mechanism inside the gear train reduction allows the user to manually turn the nozzle turret in alternating clockwise and counter-clockwise directions between arc stops to identify where the sprinkler will irrigate relative to the landscape. To accomplish this, the ratcheting mechanism is located in the gear train reduction just before the reversing portion of the planetary gear drive. The ratcheting mechanism is thus located in a position where the operator is not required to back drive the entire set of gears which would otherwise require excessive force. By locating the ratcheting mechanism within an input stage of the gear train reduction, only a portion of the gear train reduction is back driven by the nozzle turret and the forces required to accomplish this back driving are greatly reduced.

The entire disclosure of U.S. patent application Ser. No. 12/710,298, filed Feb. 22, 2010, naming of Michael L. Clark and Zachary B. Simmons as co-inventors and entitled SPRINKLER WITH REVERSING PLANETARY GEAR DRIVE INCLUDING TWO RING GEARS WITH DIFFERENT PROFILES are hereby incorporated by reference. The entire disclosure of U.S. patent application Ser. No. 12/710,265, also filed Feb. 22, 2010, naming of Michael L. Clark and Zachary B. Simmons as co-inventors and entitled REVERSING MECHANISM FOR AN IRRIGATION SPRINKLER WITH A REVERSING PLANETARY GEAR DRIVE is also hereby incorporated by reference. Both of the aforementioned applications are assigned to Hunter Industries, Inc., the assignee of the present application. The entire disclosure of the aforementioned U.S. Pat. No. 7,677,469, of Michael L. Clark is also hereby incorporated by reference.

Figure 1:
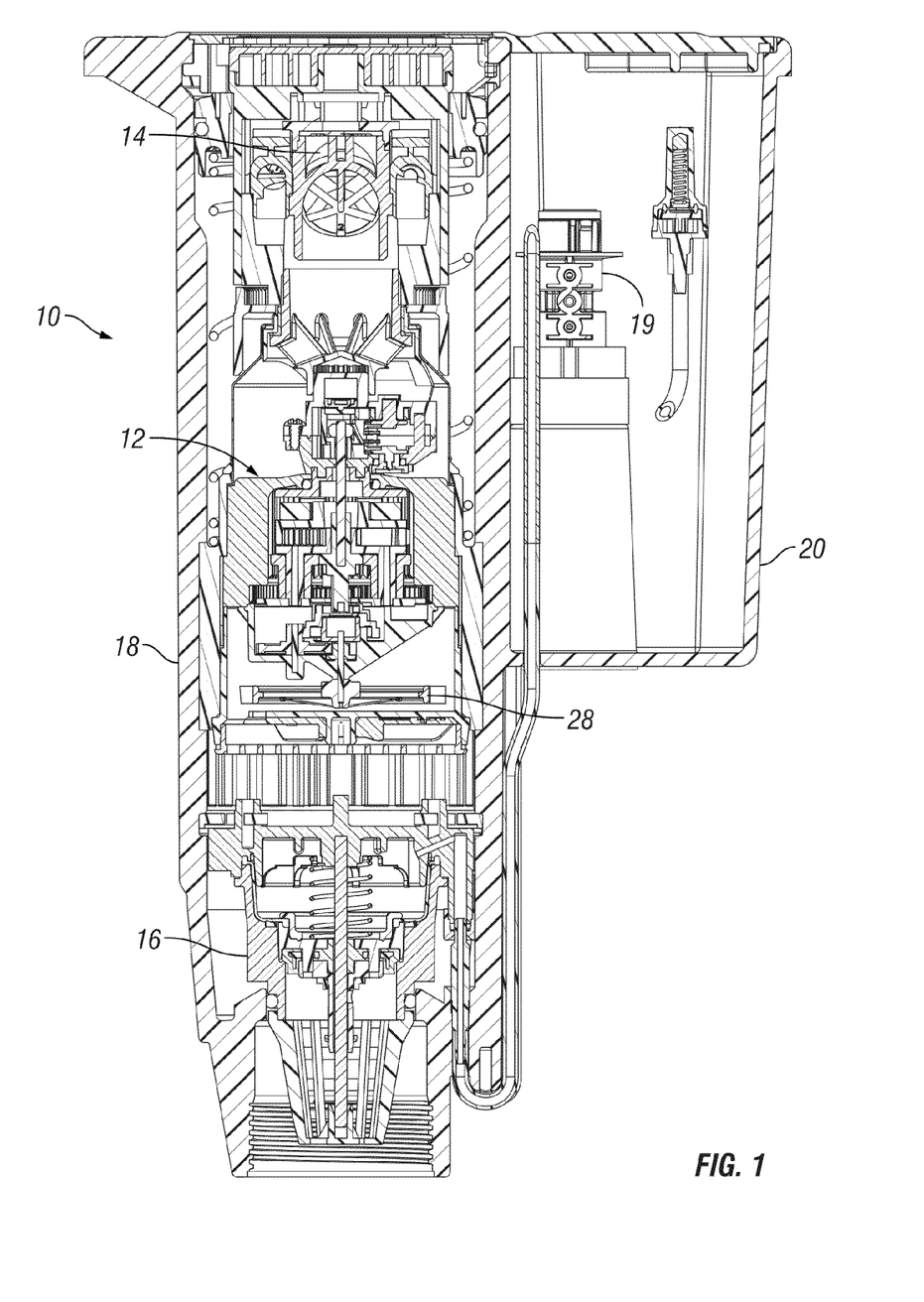
FIG. 1 is a vertical sectional view of a rotor-type sprinkler incorporating an embodiment of the present invention.
Figure 2:
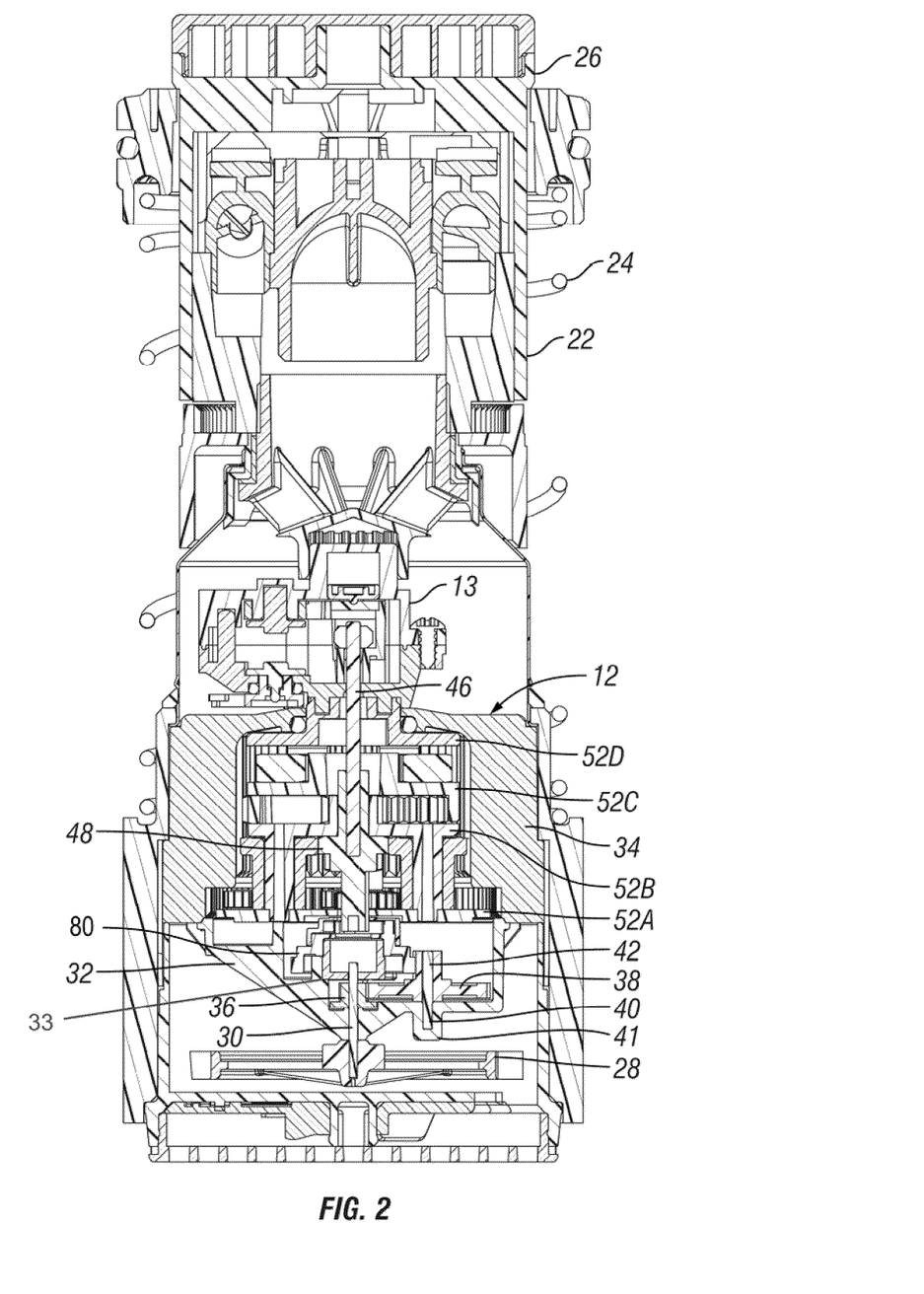
FIG. 2 is an enlarged portion of FIG. 1 illustrating details of the riser and nozzle turret of the sprinkler of FIG. 1.

Referring to FIG. 1, in accordance with an embodiment of the present invention a rotor-type sprinkler 10 incorporates a gear train reduction 12 (FIG. 2) that rotates or oscillates a nozzle 14 between pre-set arc limits. Except for the gear train reduction 12, and an additional reversing mechanism 13 with a control portion located externally of the gear train reduction 12 and a reversing portion located internally of the gear reduction 12, the sprinkler 10 has a construction similar to that disclosed in U.S. Pat. No. 6,491,235, of Scott et al. granted Dec. 10, 2002, assigned to Hunter Industries, Inc., the entire disclosure of which is hereby incorporated by reference. The sprinkler 10 is a so-called valve-in-head sprinkler that incorporates a valve 16 in the bottom of a cylindrical outer case 18 which is opened and closed by valve actuator components 19 contained in a housing 20 on the side of the case 18. The sprinkler 10 includes a generally tubular riser 22 (FIG. 2). A coil spring 24 normally holds the riser 22 in a retracted position within the outer case 18. The nozzle 14 is carried inside a cylindrical nozzle turret 26 rotatably mounted to the upper end of the riser 22. The coil spring 24 is compressible to allow the riser 22 and nozzle turret 26 to telescope from their retracted positions to their extended positions when pressurized water is introduced into the female threaded inlet at the lower end of the outer case 18.

FIG. 2 illustrates further details of the riser 22, nozzle turret 26 and the gear train reduction 12. As will be explained in further detail hereafter, the gear train reduction 12 has in input stage that has a plurality of off-set or stair-stepped gears and a reversible output stage that has a plurality of gears arranged in the form of a planetary gear drive. A turbine 28 is rigidly secured to the lower end of a vertically oriented drive input pinion shaft 30. The pinion shaft 30 extends through the lower cap 32 of a cylindrical gear box 34 of the gear train reduction 12. A pinion gear 36 is rigidly secured to the upper end of the pinion shaft 30. The pinion gear 36 drives a lower spur gear 38 secured to a spur gear shaft 40 the lower end of which is journaled in a sleeve 41 integrally formed in the lower cap 32 of the gear box 34. Another pinion gear 42 is integrally formed on top of the spur gear 38 and drives an upper spur gear 80 of the gear train reduction 12. The gears 36, 38, 42 and 80 form an input stage of the gear train reduction 12.

Figure 3:
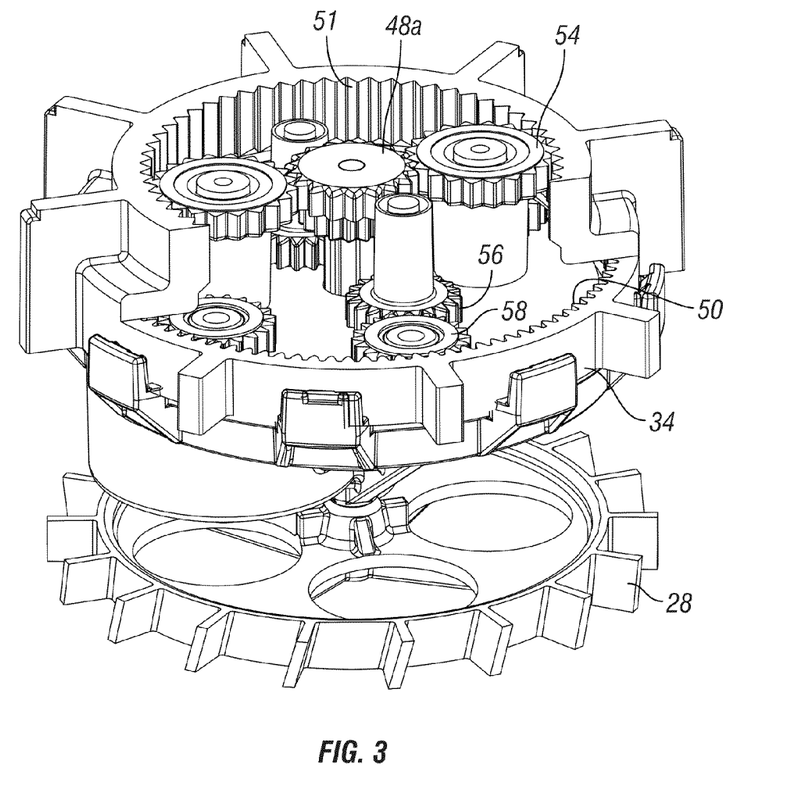
FIG. 3 is a still further enlarged fragmentary isometric view of the turbine and a portion of the planetary gear drive of the sprinkler of FIG. 1. In this view the bi-level shift sun gear is in its raised state.
Figure 4:
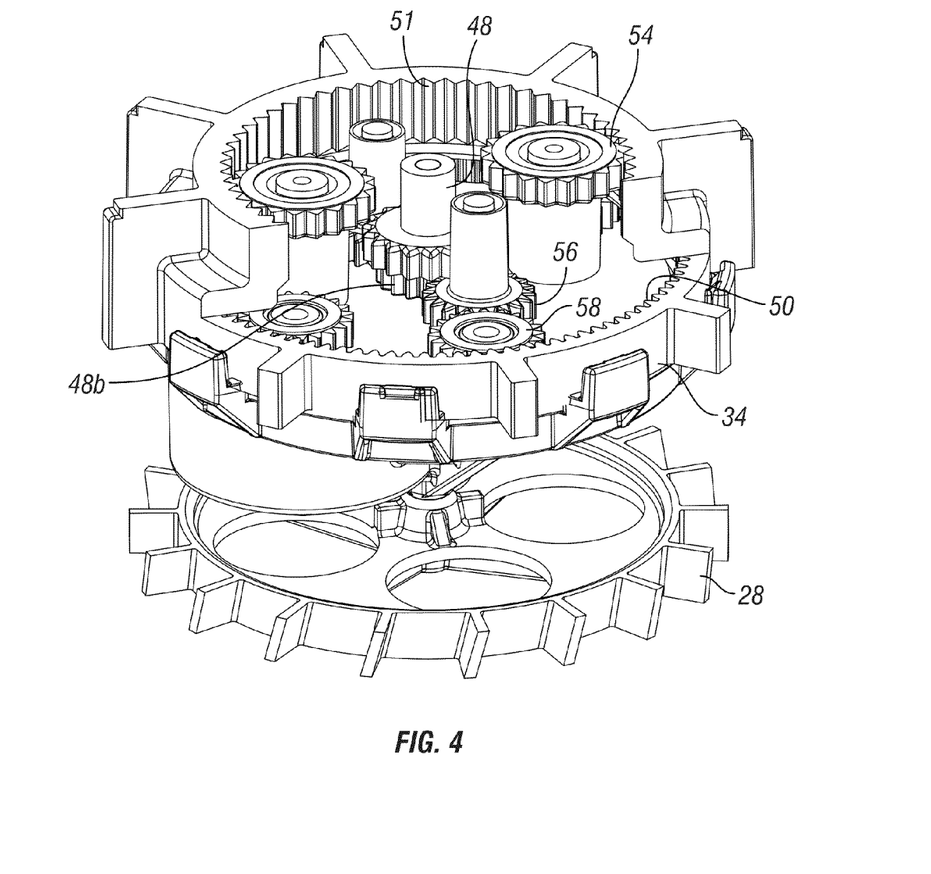
FIG. 4 is a view similar to FIG. 3 except that the bi-level shift sun gear is in its lowered state.
Figure 5:
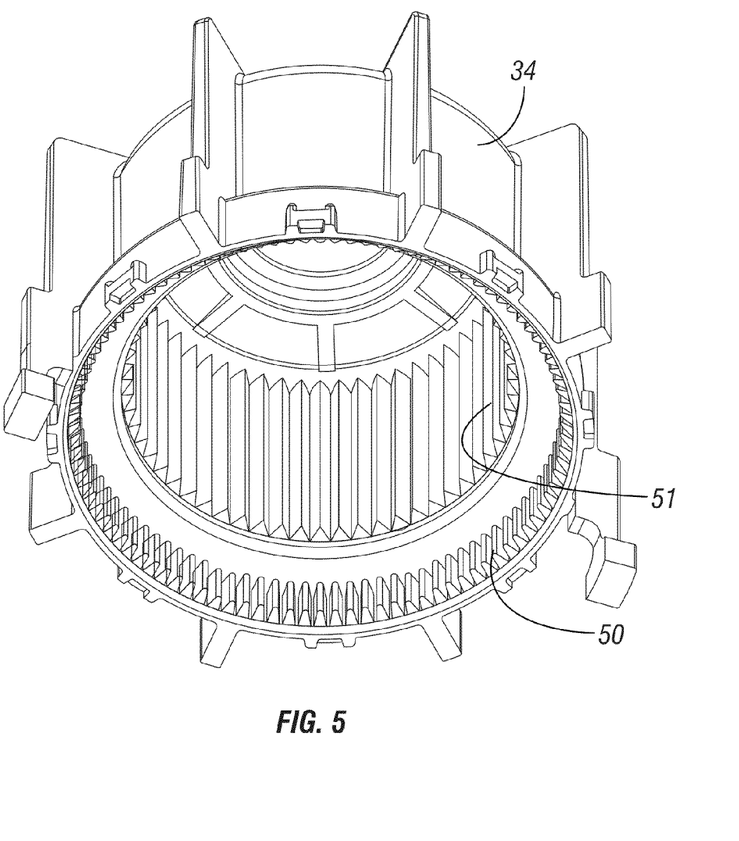
FIG. 5 is an isometric view of the gear box of the sprinkler of FIG. 1 illustrating the two ring gears integrally formed on the interior wall thereof.
Figure 6:
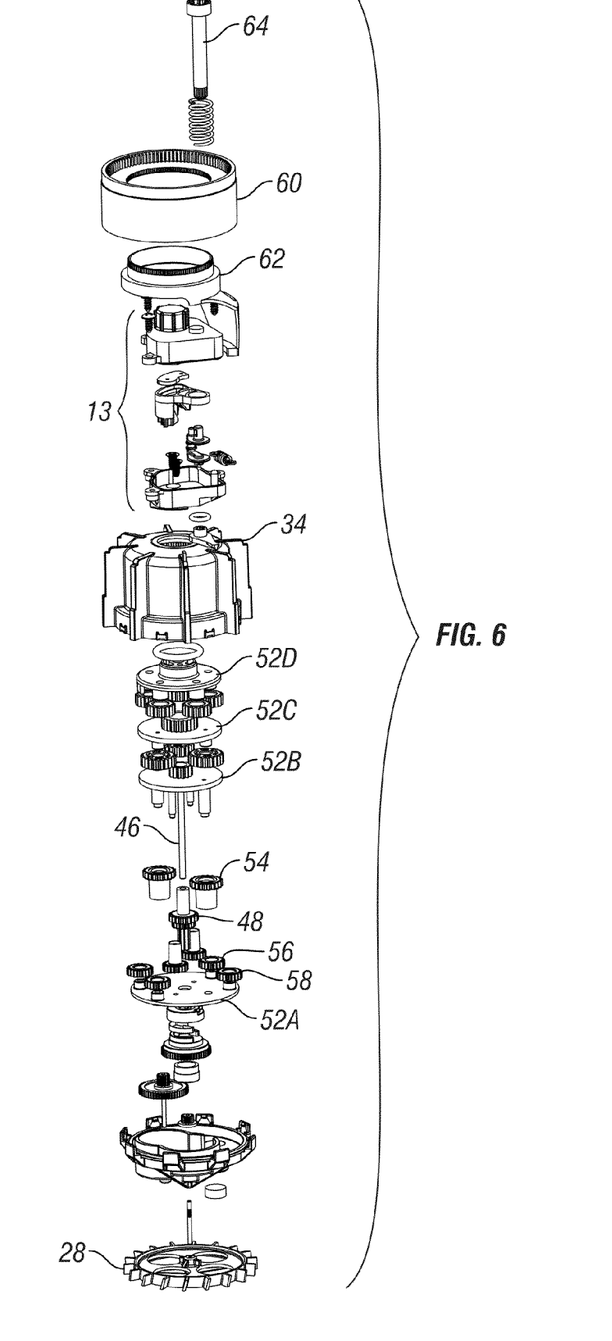
FIG. 6 is an exploded view of the reversing planetary gear drive and additional reversing mechanism of the sprinkler of FIG. 1.

Referring still to FIG. 2, an output stage of the gear train reduction 12 takes the form of a planetary gear drive with a centrally located control shaft 46. The lower end of the control shaft 46 is rigidly and co-axially coupled to a bi-level shift sun gear 48 which is vertically reciprocated by axial movement of the control shaft 46 between a raised state (FIG. 3) and a lowered state (FIG. 4). The interior wall of the cylindrical gear box 34 is formed with two ring gears 50 and 51 (FIG. 5). Each of the ring gears 50 and 51 comprises a plurality of circumferentially spaced, vertically extending, radially inwardly projecting teeth that are engaged by the various planet gears of the output stage of the gear train reduction 12 which is configured as a reversing planetary gear drive. The lower ring gear 50 has a larger diameter and more teeth than the upper ring gear 51. The upper ring gear 51 has a larger axial length than the lower ring gear 50. Together the ring gears 50 and 51 form a bi-level ring gear. Referring to FIGS. 2 and 6, the reversing planetary gear drive portion of the gear train reduction 12 includes a first stage carrier 52A, second stage carrier 52B, a third stage carrier 52B, and a fourth output stage carrier 52D all of which rotate around the control shaft 46.

Figure 9:
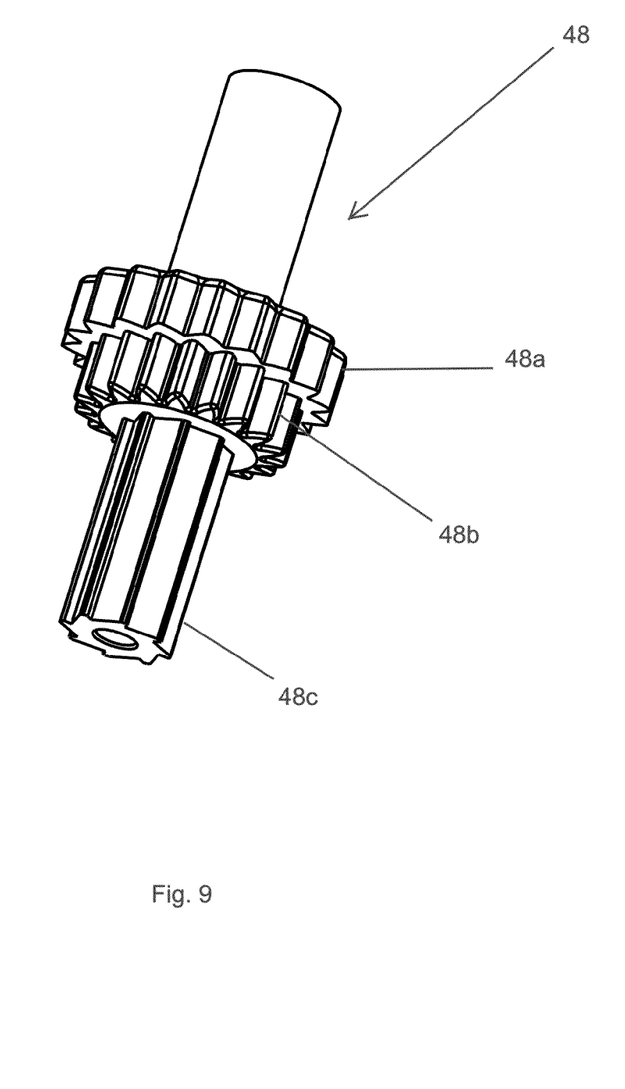
FIG. 9 is a greatly enlarged isometric view of the bi-level shift sun gear of the planetary gear drive of the sprinkler of FIG. 1.
Figure 10:
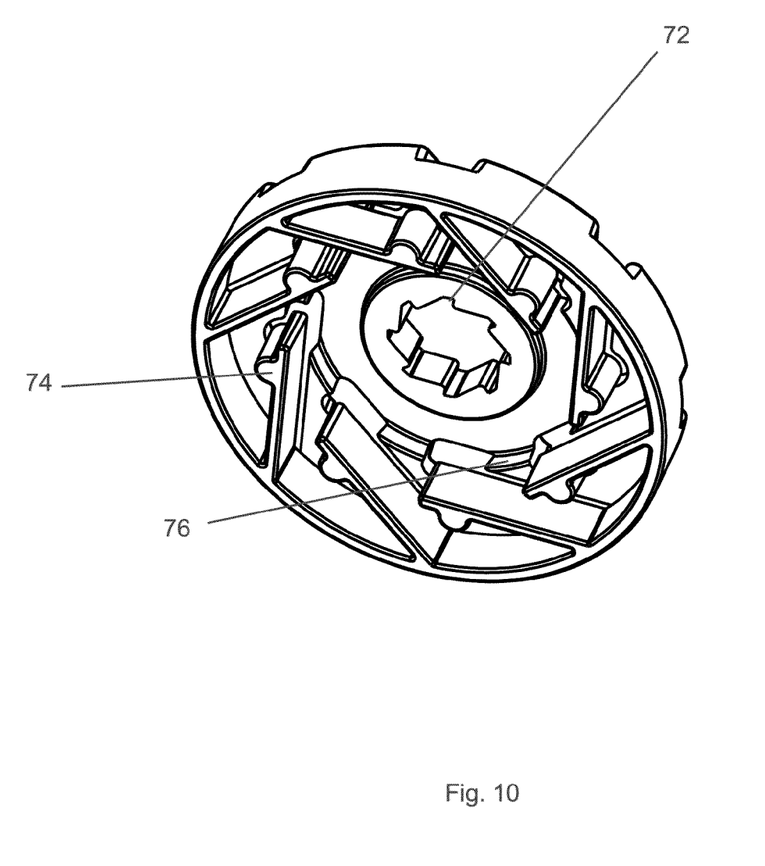
FIG. 10 is a greatly enlarged isometric view of the upper ratchet driven coupling taken from the underside thereof.

The gear train reduction 12 is provided with a mechanism that allows the nozzle turret 26 to be manually rotated between its pre-set arc stop limits without having to back drive the gears in the input stage. A central spline opening 72 (FIG. 10) in an upper ratchet driven coupling 70 (FIG. 6) is drivingly coupled to a spline-shaped extension 48c, (FIG. 9) of the bi-level shift sun gear 48 to allow for axial movement of the bi-level shift gear 48 relative to the ratchet driven coupling 70. Thus the ratchet driven coupling 70 is driven by the upper spur gear 80 to continuously rotate the bi-level shift sun gear 48 and the control shaft 46 during vertical axial reciprocating movement of the bi-level shift sun gear 48.

When the bi-level shift sun gear 48 is in its raised state (FIG. 3) the larger diameter upper stage 48a, thereof engages and meshes with a complementary planet gear 54. When the bi-level shift sun gear 48 is in its lowered state (FIG. 4) the smaller diameter lower stage 48b, thereof engages and meshes with a complementary idler gear 56. The different gear profiles of the upper and lower stages 48a, and 48b, of the bi-level shift sun gear 48 are important in matching the rotational speed of the nozzle 14 in both the clockwise and counter-clockwise directions. The planet gear 54 directly meshes with the upper ring gear 51 formed on the interior wall of the gear box 34. The idler gear 56 engages a planet gear 58 which in turn engages the lower ring gear 50. Thus the direction of rotation subsequently carried through the remaining stages of the reversing planetary gear drive is reversed by up and down movement of the control shaft 46 and the bi-level shift sun gear 48 carried therewith. The direction of rotation of the bi-level shift sun gear 48 does not change when it is vertically shifted between its two limits of axial movement. The level of rotational torque on the planet gears 54 and 58 is very low since they rotate at relatively high RPM. The meshing of the bi-level shift sun gear 48 with the shift gears planet gears 54 and 58 is very smooth. The smooth shifting transition is largely influenced by its position in the gear box 34. The rotational speed of the turbine 28 is very high. If the shift sun gear 48 is placed too close to the turbine, in terms of the number of gears in between the turbine and the shift sun gear 48, the rotational speed of the bi-level shift sun gear 48 is too fast, and shifting the direction of rotation of the planetary gear drive will be difficult as the teeth will tend to skip past each other instead of meshing smoothly. Likewise, the final output stage of the planetary gear drive generates substantial rotational torque. If the shift sun gear 48 is placed too close to the final output of the planetary gear drive, the excessive torque will make it difficult for the teeth of the shift sun gear 48 to slip across the faces of the planet gear 54 and idler gear 56 and shifting will be difficult. The pitch of the gears on the upper and lower stages 48a, and 48b, of the bi-level shift sun gear 48, the idler gear 56 and the planet gears 54 and 58 must match that of the respective ring gears 50 and 51 in order that they mesh properly. However, it is not necessary that the pitch of the teeth on the upper ring gear 51 be the same as those on the lower ring gear 50 as they are completely independent drive sections of the reversing planetary gear portion of the gear train reduction 12.

The reversing planetary gear drive of the gear train reduction 12 further includes additional sun gears and planet gears which need not be described in detail as they will be understood by those skilled in the art of sprinkler design based on viewing the configuration of the reversing planetary gear drive as illustrated in detail in FIG. 6. The other planet gears also engage the ring gear 51 and rotate about corresponding fixed cylindrical posts that extend axially from their associated carriers 52A, 52B, 52C and 52D. Each non shifting sun gear is rigidly secured to, or integrally formed with, one of the carriers 52B, 52C and 52D. The uppermost carrier 52D has an upwardly projecting central section that is coupled to the underside of the reversing control mechanism 13 in order to rotate the same. The reversing control mechanism 13 (FIG. 2) in turn supports and rotates the nozzle turret 26. With this arrangement of gears the RPM of the turbine 28 is successively reduced so that the final output RPM of the output carrier 52D is relatively low, and the output torque is relatively high. For example, the turbine 28 may rotate at eight hundred RPM and the output carrier 52D may rotate at an RPM of less than one. High output torque is important for large area sprinklers. Sprinklers of this type can discharge seventy-five gallons of water per minute at one-hundred and twenty PSI to throw water one hundred and fifteen feet from the sprinkler. Discharging water at this rate creates substantial upward and radial forces on the nozzle turret 26 that results in significant drag and resistance to rotation of this key component of a rotor-type sprinkler. The gear boxes utilized in this type of sprinkler must overcome this resistance.

The fast spinning turbine 28 can slowly rotate the nozzle turret 26 through the reversing gear train reduction 12 and the additional reversing control mechanism 13. The additional reversing control mechanism 13 includes cams and components that axially shift the control shaft 46 by lifting and dropping the output shaft 46. An adjustable arc mechanism including a ring gear ring 60, an arc tab carrier ring 62 and an adjusting gear 64, cooperates with the reversing control mechanism 13 to permit user adjustment of the size of the arc of oscillation of the nozzle 14. This determines the so-called arc of coverage of the sprinkler 10 that is defined by the pattern of water sprayed from the nozzle 14. The structure of the additional reversing control mechanism 13 is described in detail in the aforementioned U.S. patent application Ser. No. 12/710,265, entitled REVERSING MECHANISM FOR A PLANETARY GEAR DRIVE SPRINKLER of Michael L. Clark and Zachary B. Simmons. The bi-level shift sun gear 48 has a neutral position between the two planet gears 54 and 58 in which it is not engaged with either of these two gears. This precludes any possibility that the bi-level sun gear 48 will strip either or both of the planet gears 54 and 58. The bi-level shift sun gear 48 always rotates as a result of the upstream rotating gears that are driven by the turbine. If the gear teeth of the bi-level shift sun gear 48 do not immediately engage with their respective sun gears during shifting, the teeth will align within one tooth of rotation. The bi-level shift sun gear 48 is spring biased both upwardly and downwardly from this neutral position by an over-center spring mechanism inside the additional reversing control mechanism 13. This ensures that the planetary gear drive will be in one of two driving states, either rotating the nozzle 14 clockwise or counterclockwise.

Thus the sprinkler 10 uses the reversing planetary gear drive portion of the gear train reduction 12 and the additional reversing control mechanism 13 to change the direction of rotation of the nozzle turret 26. The overall reversing mechanism of the sprinkler 10 has two portions, namely, the components of the reversing control mechanism 13 that are located external of the gear box 34, and another portion that is contained within the planetary gear drive portion of the gear train reduction 12 enclosed inside the gear box 34. The planetary gear drive forms the output stage of the gear train reduction and includes the bi-level shifting sun gear 48, planetary gear 54 and planetary gear 58. The advantage of including at least a portion of the overall reversing mechanism in the planetary gear drive is that the shifting can be done in a low torque region of the gear train reduction where damage and wear to gears is much less likely to occur. This eliminates the need to use conventional arc-shaped shifting frames with delicate pinion gears that engage a bull ring gear assembly and bear large loads. The planetary gear drive portion of the gear train reduction can deliver relatively high rotational torque to the nozzle turret 26 in a manner that is useful in large rotor-type sprinklers used to water golf courses and playing fields. Such high torque may prematurely wear out and/or strip conventional pivoting gear train reversing mechanisms. The different gear tooth profiles of the ring gears 50 and 51 and the upper and lower stages 48a, and 48b, of the bi-level shift sun gear 48 desirably result in the nozzle 14 rotating in both the clockwise and counter-clockwise directions at a substantially uniform predetermined speed of rotation.

Figure 7:
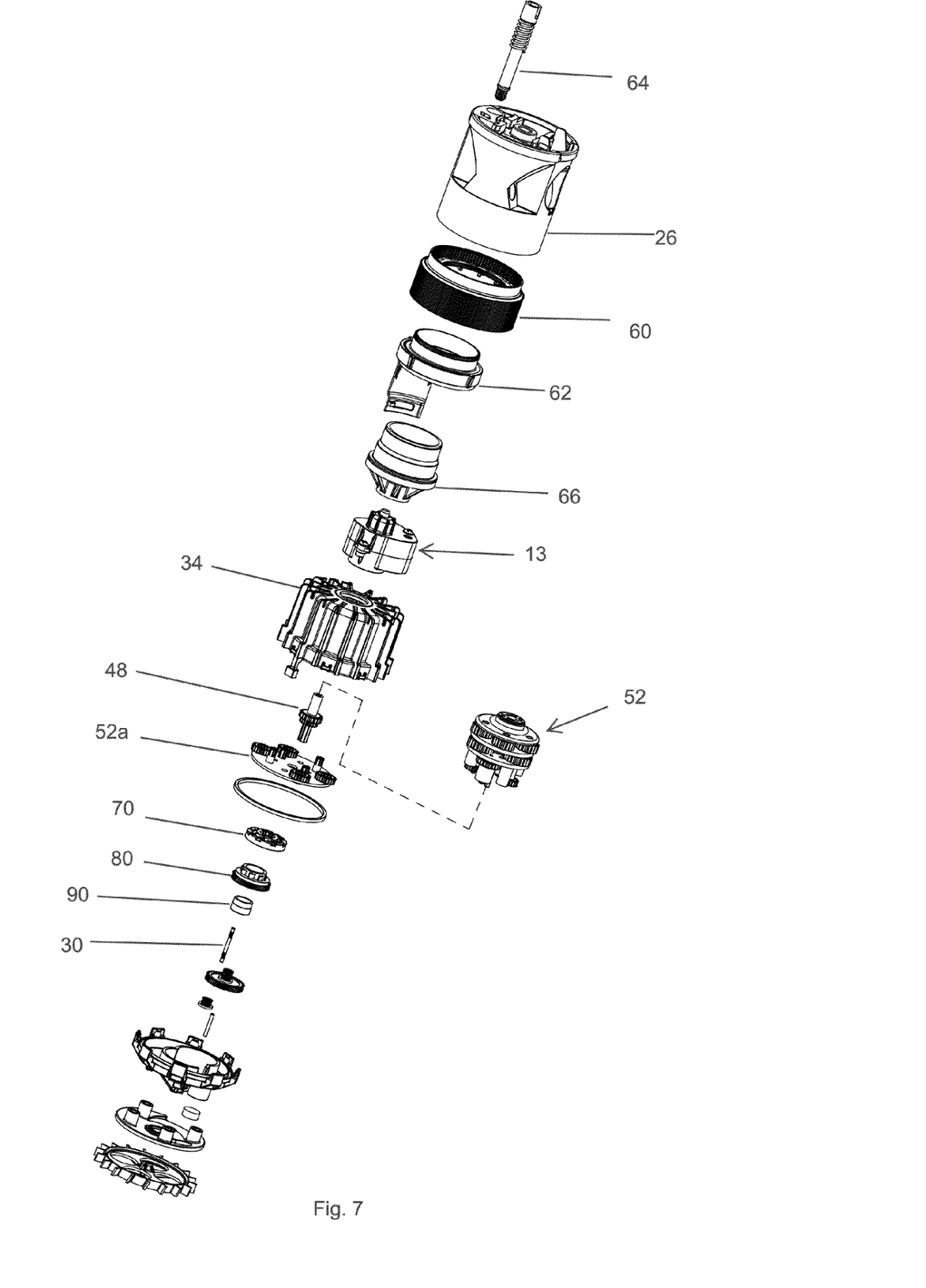
FIG. 7 is an enlarged exploded view of the reversing planetary gear drive and ratcheting mechanism.
Figure 11:
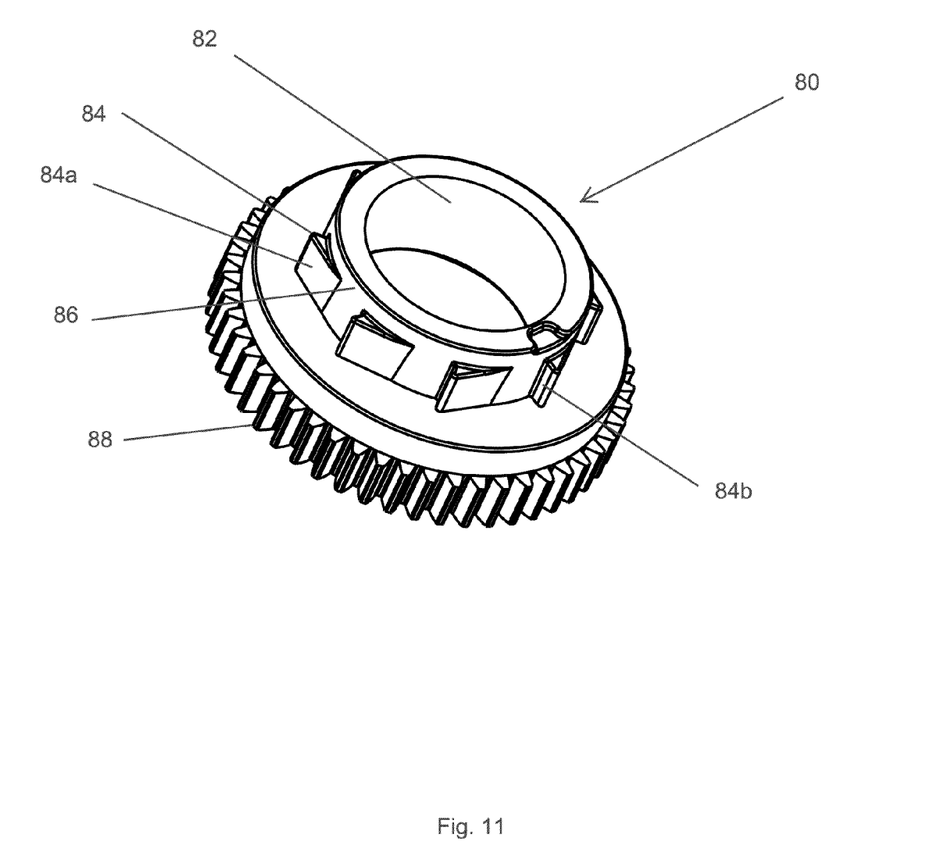
FIG. 11 is a greatly enlarged view of the upper spur gear taken from the top side thereof.

FIG. 7 illustrates the relative position of a ratchet driven coupling 70 and the upper spur gear 80. These ratcheting components are located below and in advance of the reversing planetary gear drive portion of the gear train reduction 12. In other words, the ratcheting mechanism provided by the combination of the sun gear and the ratchet driven coupling 70 is located in the off-set gear input stage of the gear train reduction, below and in advance of the reversing planetary gear drive output stage. In this location, the upper spur gear 80 is driven in normal operation by the pinion gear 42 (FIG. 2). As the upper spur gear 80 is turned by the pinion gear 42, the flat drive stops 84b, of a plurality of individual lobes 84 (FIG. 11) engage with a plurality of spring fingers 74 (FIG. 10) of the ratchet driven coupling 70. Multiple surfaces 76 circumferentially surround a smooth upper portion of a cylindrical extension of the upper spur gear 80 to keep the spur gear 80 and the ratchet driven coupling 70 concentric. The splined shaped extension 47 attached to the sun gear 48 is driven by the mating spline opening 72 in the coupling 70. This causes the coupling 70 to turn as a result of water flow passing through the turbine 28 and driving the reversing planetary gear drive 12. Because the ratchet driven coupling 70 is located below the reversing planetary gear drive, the turbine 28 always drives the ratchet driven coupling 70 in one direction. Gears 36, 38, 42 and 80 form the off-set portion of the gear train reduction 12 that is below or ahead of the planetary portion of the gear train reduction. The ratchet driven coupling 70 and the spur gear 80 are located in this portion of the drive assembly of the sprinkler 10. When an irrigation installer or other person attempts to manually rotate the nozzle turret 26, it will freely turn in the direction of operation as the spring fingers 74 deflect over the ramped portion 84a, of the lobes 84 and allow for a relatively free manual rotation of the nozzle turret 26. When the nozzle turret is manually rotated in either a clockwise or counter-clockwise direction a sufficient amount to engage an arc stop, the reversing control mechanism 13 will cause the bi-level sun gear 48 to shift either up or down to change rotation of the nozzle turret 26. Although the nozzle turret 26 can now be manually rotated in the opposite direction, the ratcheting coupling 70 continues to turn in the same direction. This is because the reversing operation is between the ratcheting coupling 70 and the rotating nozzle turret 26. As a result of this novel design of the present invention the operator can manually turn the nozzle turret 26 back and forth between arc stop settings to visually identify where the sprinkler will irrigate during normal operation with relative ease.

The arc stops of the sprinkler 10 are provided by a fixed arc tab and an adjustable arc tab as described in detail in the aforementioned co-pending U.S. patent application Ser. No. 12/710,265. The portion of the reversing mechanism outside the gear train reduction 12 includes a shift toggle that is pivoted back and forth when it engages the arc tabs and provides tactile feedback to the user that the nozzle turret 26 has reached the arc stops that are defined by the circumferential locations of the fixed and adjustable arc tabs. The ratchet driven coupling 70 allows the operator to manually rotate the nozzle turret 26 without having to back drive the reducing gears that are located between the turbine 28 and the upper spur gear 80. The operator does back drive the planetary gears 52, but this is much easier than having to back drive the entire gear reduction between the turbine 28 and the nozzle turret 26.

Figure 8:
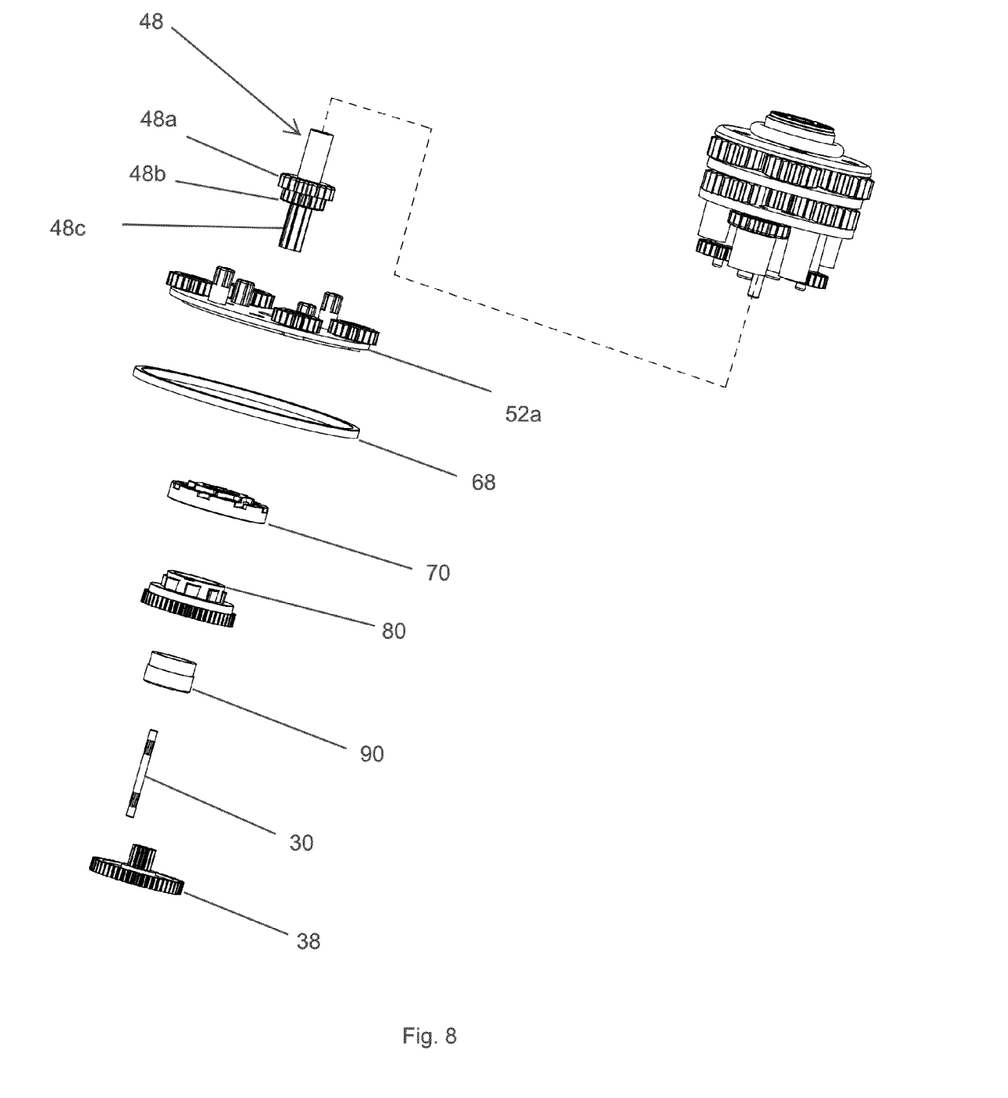
FIG. 8 is an enlarged exploded view of the ratcheting mechanism components.
Figure 12:
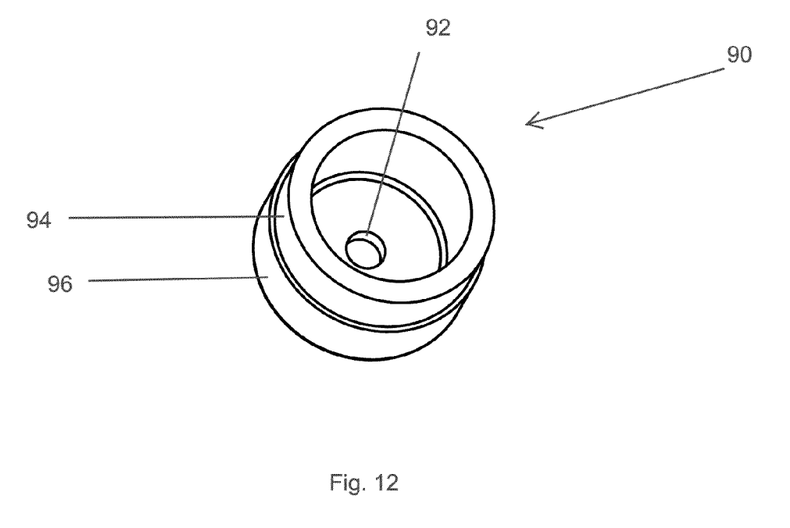
FIG. 12 is a greatly enlarged isometric view of the bearing support that fits inside the upper spur gear.

A bearing support 90 (FIG. 8) provides support to the upper end of shaft 30 as well as the upper spur gear 80. An outer surface 96 (FIG. 12) of the bearing support 90 is press fit into a bore 33 of the lower housing 32 (FIG. 2). The shaft 30 extends into a bore 92 in the bearing support 90 and rotates relative to the bearing support 90. An outer surface 94 of the bearing support 90 loosely fits inside a bore 82 of the upper spur gear 80 to provide a concentric bearing surface to support the upper spur gear 80. Upper spur gear 80 rotates relative to the bearing support 90.

Persons skilled in the art of commercial and residential irrigation will appreciate that we have also provided a novel method of setting the arc stops of an oscillating rotor-type sprinkler with a reversible planetary gear drive. A first step our method involves providing an oscillating rotor-type sprinkler having a reversing control mechanism with a pair of arc tabs at least one of which has an adjustable circumferential location, the sprinkler further having a gear train reduction that includes at least a reversible planetary gear drive, and a ratchet driven coupling in the gear train reduction. The next step of our method involves setting an initial location of the adjustable arc stop to establish a predetermined arc of coverage of the sprinkler when a nozzle turret of the sprinkler is oscillated between the arc stops by the reversing mechanism during normal operation with pressurized water. The next step of our method involves manually rotating the nozzle turret back and forth between the arc stops to visually confirm an arc of coverage of the sprinkler without back driving all of a plurality of gears in the gear train reduction. The nozzle turret can be manually rotated between its arc stops as described either with, or without, pressurized water flowing through the sprinkler.

While we have described and illustrated in detail an embodiment of a sprinkler with a reversing planetary gear drive that include a feature to allow the sprinkler to be manually rotated between its arc stop settings, it should be understood that our invention can be modified in both arrangement and detail. For example the reversing planetary gear drive could be configured to work with a bi-level ring gear and a shifting sun gear with a single profile, or a bi-level shifting sun gear and a ring gear with a single profile. The ratcheting mechanism could be placed in different positions in the gear train reduction. Additionally, the riser could be configured as a fixed riser that does not extend or retract from an outer cylinder. It is not necessary for the gear train reduction 12 to have different stages. Our invention can take the form of a rotor-type sprinkler that has a reversible planetary gear drive, and a one-way drive mechanism located ahead of the reversing part of the planetary gear drive so that the nozzle can be manually rotated between arc limits without having to back drive all of the gears of the planetary gear drive. Thus our invention could take the form of a rotor-type sprinkler with a gear train reduction that does not include an additional off-set input stage. Additionally, our invention could be used in a planetary gear drive that does not include the reversing feature and where the sprinkler operates in a continuous rotation in one direction where the one way drive mechanism is located between a first and a last gear reduction segment. Moreover, the ratchet form of mechanism is just one of such a clutch mechanism that could be used. Other configurations such as slip clutches, etc. could be utilized. Therefore the protection afforded our invention should only be limited in accordance with the following claims.

We claim:

1. A sprinkler, comprising:
    a turbine;
    a nozzle;
    a gear train reduction in a housing having at least a reversing planetary gear drive portion; a reversing control mechanism located outside of the gear train reduction that couples the gear train reduction and the nozzle and includes a pair of arc tabs, at least one of the arc tabs being adjustable to establish an arc of coverage of the sprinkler when water flowing past the turbine causes the gear train reduction and the reversing mechanism to oscillate the nozzle back and forth between a pair of arc stops defined by location of the arc tabs; and
    a mechanism located in the gear train reduction that allows manual rotation of the nozzle between the arc stops without having to back drive all of the gears in the gear train reduction.

2. The sprinkler of claim 1 and further comprising a riser surrounding the gear train reduction, an outer case surrounding the riser, and a coil spring surrounding the riser and normally holding the riser in a retracted position within the case and compressible to allow the riser to telescope to an extended position when pressurized water is introduced into the case.

3. The sprinkler of claim 2 wherein the nozzle is carried inside a nozzle turret rotatably mounted at an upper end of the riser.

4. The sprinkler of claim 1 wherein the sprinkler further includes a fixed arc tab extending in a predetermined location so that the fixed arc tab can be engaged by a shift toggle of the pair of arc tabs located outside of a planetary output stage of the reversing mechanism to pivot the shift toggle.

5. The sprinkler of claim 4 wherein the sprinkler further comprises a nozzle turret carrying the nozzle, a carrier ring coupled to the nozzle turret and rotatable relative to the housing, a ring gear ring coupled to the carrier ring, and an adjustable arc tab extending from the carrier ring in a predetermined location so that the adjustable arc tab can be engaged by the shift toggle as the housing is rotated by the planetary output stage of the reversing mechanism to pivot the shift toggle.

6. The sprinkler of claim 5 wherein the mechanism that allows manual rotation of the nozzle between the arc stops without having to back drive all of the plurality of gears in the gear train reduction comprises a gear that cooperates with a ratchet driven coupling.

7. The sprinkler of claim 6 wherein the ratchet driven coupling has a plurality of spring fingers.

8. The sprinkler of claim 7 wherein the gear that cooperates with the ratchet driven coupling is a spur gear with an extension that has a plurality of ramps that engage and slide past the spring fingers of the ratchet driven coupling when the spur gear is rotated in a first direction relative to the ratchet driven coupling.

9. The sprinkler of claim 8 wherein the extension of the spur gear has a plurality of stops that engage the fingers and prevent relative rotation between the spur gear and the ratchet driven coupling when the spur gear is rotated is a second opposite direction relative to the ratchet driven coupling.

10. The sprinkler of claim 9 wherein the ratchet driven coupling has a spline opening.

11. A sprinkler, comprising:
    a turbine;
    a nozzle;

a gear train reduction in a housing having an input stage and a planetary output stage; and a reversing mechanism that rotatably couples the planetary output stage and the nozzle, a first portion of the reversing mechanism being located in the planetary output stage and a second portion of the reversing mechanism being located outside of the planetary output stage, the second portion of the reversing mechanism including a pair of arc tabs, at least one of the arc tabs being adjustable to establish an arc of coverage of the sprinkler when water flowing past the turbine causes the gear train reduction and the reversing mechanism to oscillate the nozzle back and forth between a pair of arc stops defined by locations of the arc tabs, and the input stage of the gear train reduction including a mechanism that allows manual rotation of the nozzle between the arc stops without having to back drive a plurality of gears in the input stage when the water is not flowing past the turbine.

12. The sprinkler of claim 11 and further comprising a riser enclosing the planetary output stage, an outer case surrounding the riser, and a coil spring surrounding the riser and normally holding the riser in a retracted position within the case and compressible to allow the riser to telescope to an extended position when pressurized water is introduced into the case.

13. The sprinkler of claim 12 wherein the nozzle is carried inside a nozzle turret rotatably mounted at an upper end of the riser.

14. The sprinkler of claim 11 wherein the sprinkler further includes a fixed arc tab extending in a predetermined location so that the fixed arc tab can be engaged by a shift toggle of the second portion of the reversing mechanism to pivot the shift toggle.

15. The sprinkler of claim 14 wherein the sprinkler further comprises a nozzle turret carrying the nozzle, a carrier ring coupled to the nozzle turret and rotatable relative to the housing, a ring gear ring coupled to the carrier ring, and an adjustable arc tab extending from the carrier ring in a predetermined location so that the adjustable arc tab can be engaged by the shift toggle as the housing is rotated by the planetary output stage to pivot the shift toggle.

16. The sprinkler of claim 15 wherein the mechanism that allows manual rotation of the nozzle between the arc stops without having to back drive the plurality of gears in the input stage comprises a gear in the input stage that cooperates with a ratchet driven coupling.

17. The sprinkler of claim 16 wherein the ratchet driven coupling has a plurality of spring fingers.

18. The sprinkler of claim 17 wherein the gear in the input stage that cooperates with the ratchet driven coupling is a spur gear with an extension that has a plurality of ramps that engage and slide past the spring fingers of the ratchet driven coupling when the spur gear is rotated in a first direction relative to the ratchet driven coupling.

19. The sprinkler of claim 18 wherein the extension of the spur gear has a plurality of stops that engage the fingers and prevent relative rotation between the spur gear and the ratchet driven coupling when the spur gear is rotated is a second opposite direction relative to the ratchet driven coupling.

20. The sprinkler of claim 19 wherein the ratchet driven coupling has a spline opening.

21. A sprinkler, comprising:
a nozzle;
a turbine;
a gear train reduction in a gear box with an input shaft driven by the turbine, the gear train reduction having an off-set portion driven by the turbine and a planetary portion driven by the offset portion, the planetary portion of the gear train reduction including a two stage sun gear connected to a control shaft that can be shifted to change a direction of rotation of an output of the gear train;

a reversing control mechanism coupling the planetary portion of the gear train reduction and the nozzle including a fixed arc tab extending at a first predetermined circumferential location so that the fixed arc tab can be engaged by a shift toggle to pivot the shift toggle, and an adjustable arc tab extending at a second predetermined circumferential location so that the adjustable arc tab can be engaged by the shift toggle to pivot the shift toggle; and a mechanism that allows manual rotation of the nozzle between the arc stops without having to back drive a plurality of gears in the off-set portion of the gear train reduction.

22. The sprinkler of claim 21 and further comprising a riser enclosing the gear train reduction, an outer case surrounding the riser, and a coil spring surrounding the riser and normally holding the riser in a retracted position within the case and compressible to allow the riser to telescope to an extended position when pressurized water is introduced into the case.

23. The sprinkler of claim 22 wherein the nozzle is carried inside a nozzle turret rotatably mounted at an upper end of the riser.

24. The sprinkler of claim 21 wherein the planetary portion of the gear train reduction is enclosed inside a gear box and the fixed arc tab extends from the gear box.

25. The sprinkler of claim 21 wherein the sprinkler further comprises a nozzle turret carrying the nozzle, a carrier ring coupled to the nozzle turret and rotatable relative to the gear box, a ring gear ring coupled to the carrier ring, and the adjustable arc tab extends from the carrier ring.

26. The sprinkler of claim 21 wherein the mechanism that allows manual rotation of the nozzle between the arc stops without having to back drive the plurality of gears in the off-set portion of the gear train reduction comprises a gear in the off-set portion that cooperates with a ratchet driven coupling.

27. The sprinkler of claim 26 wherein the ratchet driven coupling has a plurality of spring fingers.

28. The sprinkler of claim 27 wherein the gear in the off-set portion that cooperates with the ratchet driven coupling is a spur gear with an extension that has a plurality of ramps that engage and slide past the spring fingers of the ratchet driven coupling when the spur gear is rotated in a first direction relative to the ratchet driven coupling.

29. The sprinkler of claim 28 wherein the extension of the spur gear has a plurality of stops that engage the fingers and prevent relative rotation between the spur gear and the ratchet driven coupling when the spur gear is rotated is a second opposite direction relative to the ratchet driven coupling.

30. A method of setting arc stops of an oscillating rotor-type sprinkler with a reversible planetary gear drive, comprising the steps of;
providing an oscillating rotor-type sprinkler with a nozzle turret and having a reversing control mechanism with a pair of arc tabs at least one of which has an adjustable circumferential location, the sprinkler further having a gear train reduction with at least a reversible planetary gear drive, and a ratchet driven coupling in the gear train reduction; and setting an initial location of the adjustable arc stop to establish a predetermined arc of coverage of the sprinkler; and manually rotating the nozzle turret back and forth between the arc stops to visually confirm an arc of coverage of the sprinkler without back driving all of a plurality of gears in the gear train reduction.

* * * * *